(12) United States Patent
Hsiung

(10) Patent No.: US 9,509,157 B2
(45) Date of Patent: Nov. 29, 2016

(54) POWER BANK DEVICE AND CURRENT-OUTPUT METHOD THEREOF

(71) Applicant: GETAC TECHNOLOGY CORPORATION, Hsinchu County (TW)

(72) Inventor: Ta-Sung Hsiung, Taoyuan County (TW)

(73) Assignee: Getac Technology Corporation, Hsinchu County (TW)

(*) Notice: Subject to any disclaimer, the term of this patent is extended or adjusted under 35 U.S.C. 154(b) by 55 days.

(21) Appl. No.: 14/483,737

(22) Filed: Sep. 11, 2014

(65) Prior Publication Data

US 2015/0303795 A1   Oct. 22, 2015

Related U.S. Application Data

(60) Provisional application No. 61/981,639, filed on Apr. 18, 2014.

(51) Int. Cl.
| | | |
|---|---|---|
| *H02M 3/156* | (2006.01) | |
| *H02J 7/00* | (2006.01) | |
| *H02M 1/08* | (2006.01) | |
| *H02M 3/155* | (2006.01) | |
| *H02M 3/335* | (2006.01) | |
| *H02M 1/00* | (2006.01) | |

(52) U.S. Cl.
CPC ............ *H02J 7/0063* (2013.01); *H02M 3/155* (2013.01); *H02M 3/335* (2013.01); *H02M 2001/0025* (2013.01)

(58) Field of Classification Search
CPC .... H02M 3/155; H02M 3/335; H02M 3/137; H02M 3/156; H02M 2001/0025; H02J 7/0063

USPC .......................... 363/282; 327/103; 702/60, 63
See application file for complete search history.

(56) References Cited

U.S. PATENT DOCUMENTS

| | | | | |
|---|---|---|---|---|
| 6,639,433 | B1* | 10/2003 | Heckenbach | H03K 17/005 327/108 |
| 7,906,939 | B2* | 3/2011 | Kung | H02M 1/36 320/128 |
| 2002/0017941 | A1* | 2/2002 | Tsukagoshi | H03K 17/0822 327/322 |
| 2006/0113978 | A1* | 6/2006 | Suzuki | G05F 1/573 323/282 |
| 2006/0174143 | A1* | 8/2006 | Sawyers | G06F 1/26 713/300 |
| 2009/0259418 | A1* | 10/2009 | Yokomizo | H03F 3/45968 702/63 |
| 2011/0101937 | A1* | 5/2011 | Dobkin | H02M 3/156 323/282 |
| 2012/0182022 | A1* | 7/2012 | Kinouchi | G01R 31/362 324/435 |

* cited by examiner

*Primary Examiner* — Fred E Finch, III
*Assistant Examiner* — Demetries A Gibson

(57) ABSTRACT

A power bank device includes a load node, a power-supply circuit, an output circuit, a detecting unit, and a control circuit. The power-supply circuit provides an output current via the load node. The output circuit generates an output voltage at the load node according to the output current. The detecting unit generates a detecting signal according to the output current. The output circuit includes an impedance circuit. The control circuit, according to the detecting signal, controls the output circuit to switch an impedance of the impedance circuit, thereby down-regulating the output voltage and the output current.

12 Claims, 5 Drawing Sheets

POWER BANK DEVICE AND CURRENT-OUTPUT METHOD THEREOF

BACKGROUND

Technical Field

The present invention relates to a power bank device, especially to a power bank device and current-output method thereof.

Related Art

An increasing variety of electric portable devices has been developed due to the progress of technology. Accordingly, it is common to carry one or more electric products. Existing portable electric devices, such as mobile phones, laptop computers, digital cameras, MP3s, etc., use rechargeable batteries as the power source. Traditionally, users may need to use an equipped charger (transformer), to charge their electric device by changing the AC power supply to a specific voltage level. However, when the environment of AC power supply is unknown, the portable device may be unchargeable or unusable. Consequently, the power bank device with a rechargeable battery has been developed to provide the electric device with power supplied by the power bank device.

However, the specification of different electric devices may be different. For example, the required charging current is one ampere for a smart phone, but a Pad computer needs two amperes. The power bank device may be set with a different capacity and output power; that is the setting may be based on an output current of one or two amperes. However, when the output power of the power bank device is higher, the size of the power bank device is relatively larger. This may be inconvenient for users to carry. With respect to the above problems, there is a need for solution to the existing problems.

SUMMARY

In view of the above problem, the present invention provides a power bank device and current-output method thereof, which may support both small output current and output current without increasing the size of the power bank device, and may therefore be more convenient for users to carry.

In one embodiment, a power bank device includes a load node, a power-supply circuit, an output circuit, a detecting unit, and a control circuit. The power-supply circuit provides output current via the load node. The output circuit generates output voltage at the load node according to the output current. The detecting unit generates a detecting signal according to the output current. The output circuit includes an impedance circuit. The control circuit controls the output circuit to switch an impedance of the impedance circuit according to the detecting signal, so as to reduce the output voltage, and then reduce the output current.

In one embodiment, a current-output method of a power bank device includes: providing an output current by using a power-supply circuit via a load node; generating an output voltage at the load node according to the output current; detecting an output current; and reducing the output voltage when the detected output current is higher than a predetermined current value, so as to reduce the output current.

As described above, the power bank device and current-output method thereof according to any embodiment of the invention is used to switch the impedance of the impedance circuit based on the instantaneous change of the output current, so as to control the output current and to support the load for various charging demand without increasing the volume (or the size), of the whole circuit.

Detailed description of the characteristics and the advantages of the present invention are shown in the following embodiments. The technical content and the implementation of the present invention should be readily apparent to any person skilled in the art from the detailed description, and the purposes and the advantages of the present invention should be readily understood by any person skilled in the art with reference to content, claims and drawings in the disclosure.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
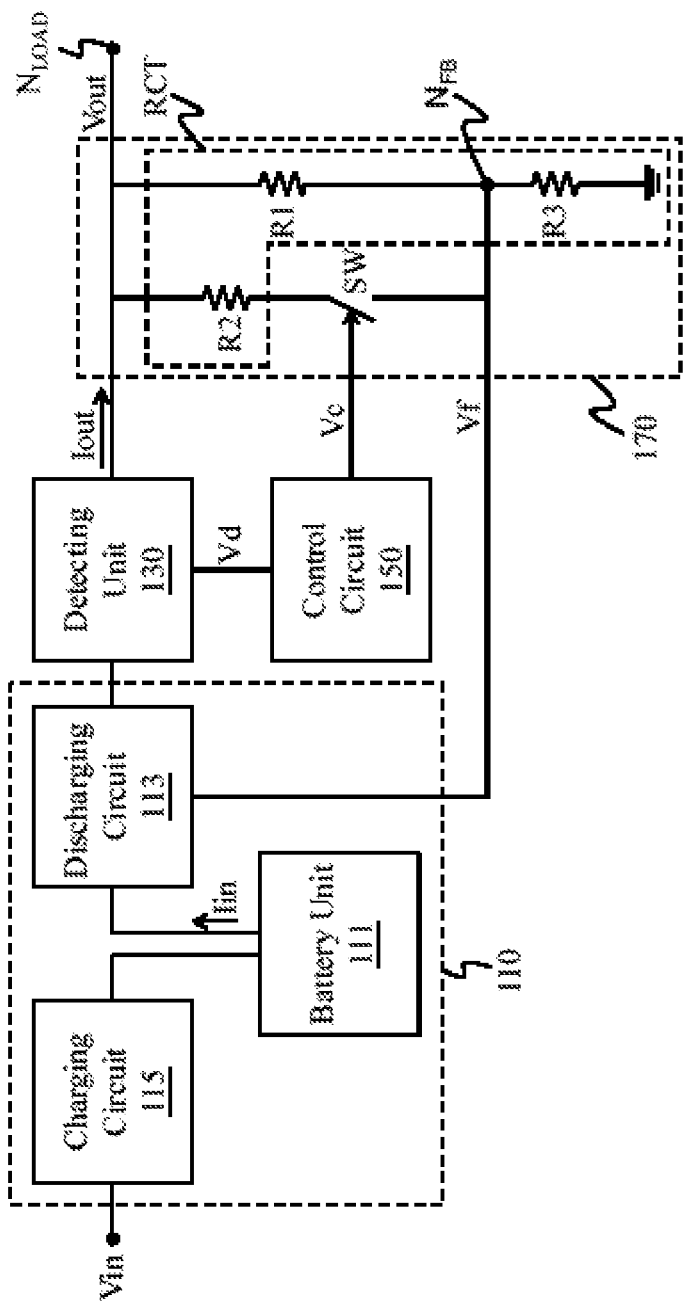
FIG. 1 is a block diagram of a power bank device according to an embodiment of the present invention.

FIG. 1 is an exemplary block diagram of a power bank device according to an embodiment of the present invention. A power bank device includes a load node $N_{LOAD}$, a power-supply circuit 110, a detecting unit 130, a control circuit 150, and an output circuit 170.

The detecting unit 130 is coupled to the power-supply circuit 110, the output circuit 170, and the load node $N_{LOAD}$. In this embodiment, the detecting unit 130 is connected between the power-supply circuit 110 and the output circuit 170, and the output circuit 170 is connected between the detecting unit 130 and the load node $N_{LOAD}$. The control circuit 150 is coupled between the detecting unit 130 and the output circuit 170.

According to the output current Tout, the output circuit 170 generates an output voltage Vout at the load node $N_{LOAD}$. According to the output current Tout, the detecting unit 130 generates a detecting signal Vd. According to the detecting signal Vd, the control circuit 150 controls the output circuit 170 to switch an impedance of an impedance circuit RCT for reducing the output voltage and reducing the output current.

Figure 2:
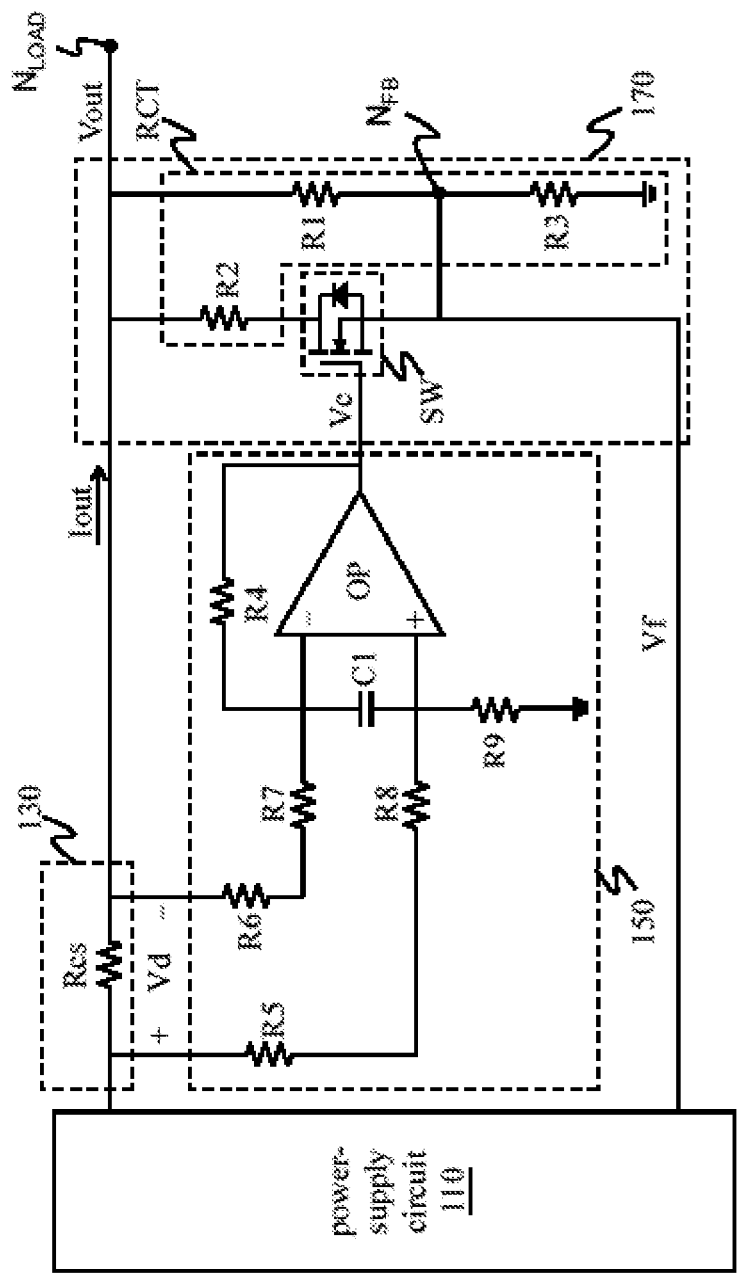
FIG. 2 is another block diagram of a power bank device according to another embodiment of the present invention.

FIG. 2 is another block diagram of a power bank device according to another embodiment of the present invention. In one embodiment, referring to FIG. 1 and FIG. 2, the output circuit 170 further includes a switching unit SW, which may be a Metal-Oxide-Semiconductor Field-Effect Transistor (MOSFET), and preferably may be NMOS. However, the present invention is not limited to those switch elements. The switching unit SW is coupled between the impedance circuit RCT and the control circuit 150. According to the detecting signal Vd, the control circuit 150 generates a driving signal Vc inputting to a control end of the switching unit SW (MOSFET gate). The switching unit SW responses the driving signal Vc to switch the impedance of the impedance circuit RCT from a first impedance to a second impedance, so as to allow the control circuit 150 to control the output circuit 170 for reducing the output voltage Vout and reducing the output current Tout.

Specifically, the impedance circuit RCT includes a first resistor R1, a second resistor R2, and a third resistor R3. A first end of the first resistor R1 and a first end of the second resistor R2 are connected to the load node $N_{LOAD}$, a second end of the first resistor R1 and a first end of the third resistor R3 are connected to a second end of the switching unit SW, and a second end of the second resistor R2 is connected to a first end of the switching unit SW. The first impedance as mentioned above is complied with formula of "Vout=$V_{NFB}$×[1+(R1/R3)]", and the second impedance is complied with formula of "Vout=$V_{NFB}$×{1+[(R1//R2)/R3)]}"; wherein the $V_{NFB}$ is the terminal voltage of the feedback point $N_{FB}$. According to the above two formulas, the first impedance is greater than the second impedance.

When the output current Tout is lower than or equal to a predetermined current value, the detecting unit 130 detects the output current Tout and correspondingly generates a detecting signal Vd. According to the detecting signal Vd, The control circuit 150 controls the switching unit SW as "disconnection status (off)". Meanwhile, the second end of the second resistor R2 is disconnected, which is disconnected with the second end of the first resistor R1 and the first end of the third resistor R3. In this embodiment, the operation of the impedance circuit RCT is based on the series circuit formed by the first resistor R1 and the third resistor R3. Accordingly, the impedance of the impedance circuit RCT is formed by the consisting of the first resistor R1 together with the third resistor R3. That is, the first impedance is complied with the formula of "Vout=$V_{NFB}$*[1+(R1/R3)]".

When the output current Tout is higher than a predetermined current value, the detecting unit 130 detects the instantaneous large-current and correspondingly generates a detecting signal Vd. The control circuit 150 controls the switching unit SW as "connection status (on)" according to the detecting signal Vd. Meanwhile, through the switching unit SW, the second end of the second resistor R2 is electrically connected to the second end of the first resistor R1 and the first end of the third resistor R3. In this embodiment, the operation of the impedance circuit RCT is based on the combination circuit where the parallel circuit formed by the first resistor R1 and the second resistor R2 is serially connected to the third resistor R3. Accordingly, the impedance of the impedance circuit RCT is formed by the consisting of the first resistor R1 and the third resistor R3. That is, the second impedance is complied with the formula of "Vout=$V_{NFB}$*{1+[(R1//R2)/R3)]}".

In other words, when a load (not shown) sinks a large output current Tout (i.e. the output current Tout outputs the instantaneous large-current to the load), under the control of the control circuit 150, the impedance is switched from the first impedance to the relative lower second impedance, so as to reduce the output voltage Vout. Because the feedback voltage of the corresponding output voltage Vout is reduced, the power-supply circuit 110 is adjusted according to the feedback voltage Vf, so as to reduce the output voltage Vout. In this embodiment, the charging chip disposed out of the output end detects the reduced lower output voltage Vout to determine the lack of the input power source, so as to reduce the sank charging current (i.e. the output current Tout). Thus, the power bank device reduces the output current Tout into the predetermined current value, and stably charges the load with the predetermined current.

The second end of the first resistor R1 together with the first end of the third resistor R3 form a feedback point $N_{FB}$ (i.e., a cross point), which provides a feedback voltage Vf. According to the voltage difference between the driving signal Vc and the feedback voltage Vf and the threshold voltage of the switching unit SW, the switching unit SW determines the connection or disconnection thereof. For example, when the output current Tout is higher than a predetermined current value, the control circuit 150 increases the output voltage level of the driving signal Vc to have a voltage difference between the driving signal Vc and the feedback voltage Vf is higher than the threshold voltage of the switching unit SW, so as to have the switching unit SW in connection status. In this embodiment, the switching unit SW and the power-supply circuit 110 are coupled at the same feedback point $N_{FB}$; however which is not used to limit the present invention. In other words, according to different requirement of circuit designs, which may provide a corresponding feedback voltage Vf of the output voltage Vout, so as to have different feedback point; for example, the switching unit SW and power-supply circuit 110 are respectively coupled to two different contacts with different voltage in the impedance circuit RCT.

In one embodiment, the detecting signal Vd may be a voltage signal. When the output current Tout is higher than a predetermined current value, the detecting signal Vd changes from low level to high level, so the control circuit 150 enables the output circuit 170 to reduce the output voltage Vout. For example, the detecting unit 130 may be an impedance element Rcs with the fixed impedance, wherein the impedance element Rcs is coupled between the power-supply circuit 110 and the load node $N_{LOAD}$. The impedance element Rcs may convert the output current Tout into a voltage signal as the detecting signal Vd. In other words, when the load is charged, the output current Tout passes through the impedance element Rcs, and a voltage difference (i.e. the detecting signal Vd), is formed between two ends of the impedance element Rcs.

In one embodiment, the predetermined current value may be one Amps (A). The impedance element Rcs may be one or more resistors.

The control circuit 150 may include an operational amplifier OP. The positive terminal and negative terminal of the operational amplifier OP are respectively connected to the two ends of the impedance element Rcs. The operational amplifier OP amplifies the voltage difference between the positive terminal and negative terminal thereof, so as to generate the driving signal Vc outputting to the output circuit 170. In other words, according to the detecting signal Vd, the operational amplifier OP generates and outputs the driving signal Vc (i.e. amplified voltage signal). When the output current Tout is higher than a predetermined current value, the voltage difference between the driving signal Vc and the feedback voltage Vf may higher than the threshold voltage of the switching unit SW, so the switching unit SW may be in connection status.

In some embodiments, according to the selected elements, the control circuit 150 may further include other electric elements for normal operation. For example, referring to FIG. 2, the control circuit 150 may further include a plurality of resistors R4, R5, R6, R7, R8, and R9 and a capacitor C1; however, which are not used to limit the present invention. The capacitor C1 is connected between the positive terminal and negative terminal of the operational amplifier OP. The resistors R6 and R7 are serially connected between the negative terminal of the operational amplifier OP and the other end of the impedance element Rcs. The resistor R9 is coupled between the positive terminal and ground.

In some embodiments, referring to FIG. 1, the power-supply circuit 110 includes at least a battery unit 111 and a discharging circuit 113. The discharging circuit 113 is coupled between the detecting unit 130 and the battery unit 111. The discharging circuit 113 is further coupled to the feedback point $N_{FB}$ of the impedance circuit RCT. The battery unit 111 may store electricity for a discharging current Iin. According to the feedback voltage Vf and the discharging current Iin, the discharging circuit 113 outputs the output current Tout. In this embodiment, the discharging circuit 113 may be a buck converter, a boost converter, or a buck-boost converter. The discharging circuit 113 may include a pulse width modulation (PWM) control circuit (not shown) and a voltage conversion circuit (not shown). The PWM control circuit is coupled between the voltage conversion circuit and the feedback point $N_{FB}$, and the discharging circuit 113 is coupled between the detecting unit 130 and the battery unit 111. According to the feedback voltage Vf, the PWM control circuit generates a pulse control signal with corresponding pulse width. The voltage conversion circuit responds to the pulse control signal for regulating output. In this embodiment, the detailed structure and implementation of the battery unit 111 and the discharging circuit 113 are well known in this field, thus the detail description is omitted.

In some embodiment, referring to FIG. 1, the power-supply circuit 110 further includes a charging circuit 115. The power-supply circuit 110 is coupled between the battery unit 111 and outer connector. The charging circuit 115 receives charging voltage Vin (ex. AC or DC), input from outside via the outer connecter. The battery unit 111 is charged by the received charging voltage Vin. In this embodiment, the charging circuit 115 may increase or reduce voltage or convert AC/DC, or any combinations, and then the charged voltage is provided to the battery unit for storing. In this embodiment, the detail structure and implementation of the charging circuit 115 are well known in this field, thus the detail description is omitted.

The above mentioned load may be an electronic product, such as a mobile phone, laptop computer, digital camera, audio player, etc., with charging chip and charging/discharging battery. During the charging process, the two ends of the power line are respectively coupled to the charging connector of the load and the discharging connector of the power bank device, so as to electrically connect the charging connector of the load and the load node $N_{LOAD}$ of the power bank device.

Figure 3:
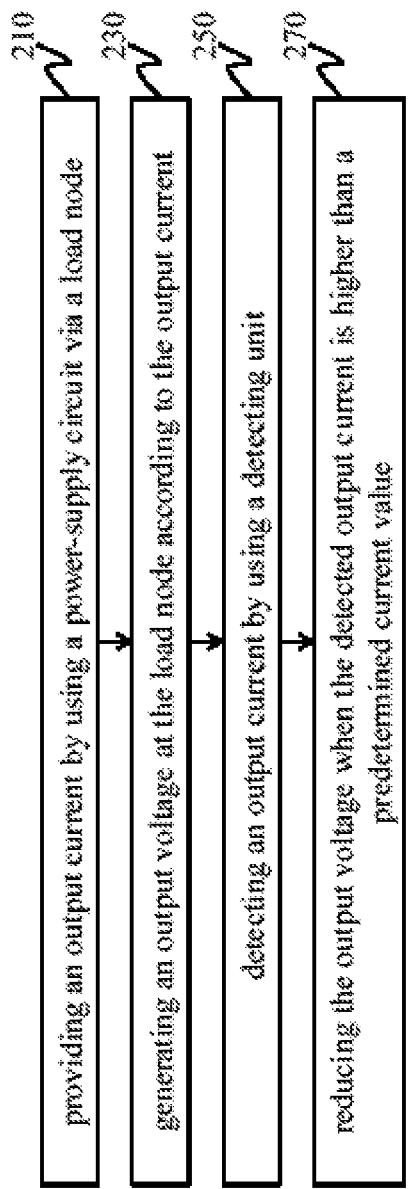
FIG. 3 is a flow chart of a current-output method of a power bank device according to an embodiment of the present invention.

Based on the above theory, the present invention provides a current-output method of a power bank device. In an embodiment, referring to FIG. 1 to FIG. 3, the current-output method of the power bank device includes providing an output current Iout by using a power-supply circuit 110 via a load node $N_{LOAD}$ (Step 210); generating an output voltage Vout at the load node $N_{LOAD}$ according to the output current Tout by using an output circuit 170 (Step 230); detecting an output current Tout by using a detecting unit 130 (Step 250); and reducing the output voltage Vout by using the control circuit 150 and the output circuit 170 when the detected output current Tout is higher than a predetermined current value, so as to reduce the output current Tout (Step 270).

Figure 4:
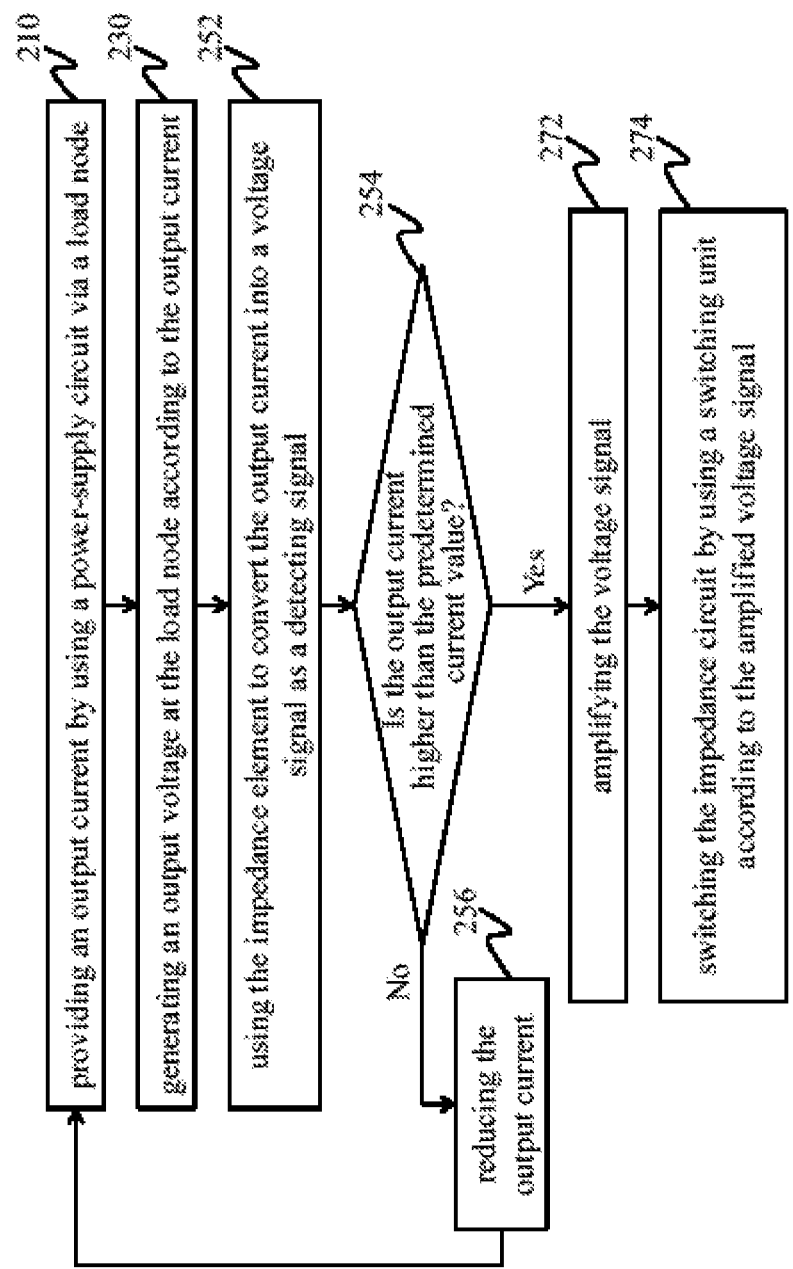
FIG. 4 is a flow chart of the a current-output method of the power bank device according to another embodiment of the present invention.

In some embodiments, referring to FIG. 1, FIG. 2, and FIG. 4, the detecting step (Step 250), may include the following steps. t The output current Tout is converted into a voltage signal as a detecting signal Vd by the he impedance element Rcs (Step 252). Next, it is determined whether the detected output current is higher than the predetermined current value or not (Step 254). If the determination is "Yes", the voltage signal is amplified by using the control circuit 150 (Step 272), and then by using a switching unit SW, the impedance circuit RCT in the output circuit 170 is switched from a first impedance to a second impedance according to the amplified voltage signal (Step 274). If the determination is "No" in Step 254, the output current is not reduced (Step 256), and then the process returns to Step 210.

Figure 5:
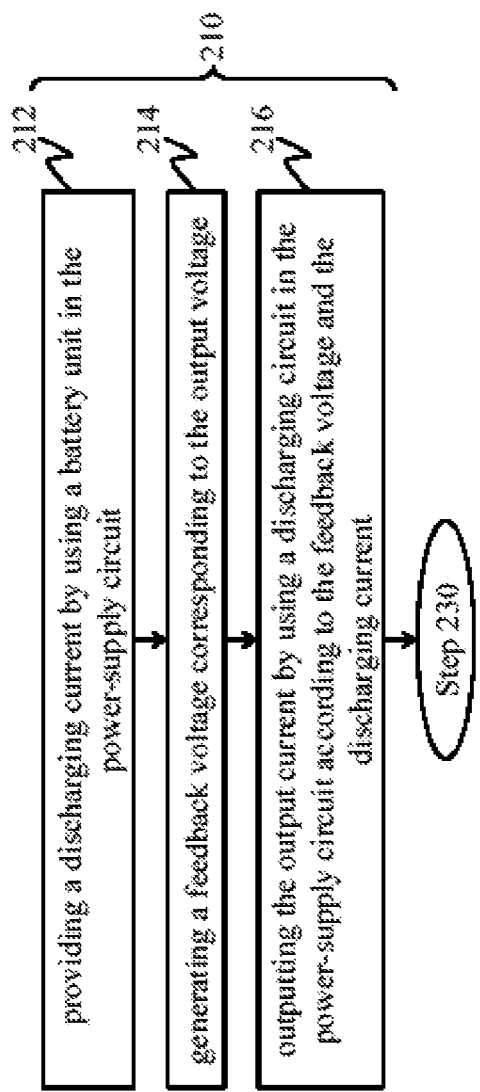
FIG. 5 is a detail method flow chart of step 210 in FIG. 3 and FIG. 4.

In some embodiments, referring to FIG. 5, the providing step (Step 210) may include providing a discharging current Tin by using a battery unit 111 in a power-supply circuit 110 (Step 212); generating a feedback voltage corresponding to the output voltage Vout by using the output circuit 170 (Step 214); and outputting the output current Iout by a discharging circuit 113 in the power-supply circuit 110 according to the feedback voltage and the discharging current Iin (Step 216). The output current Iout flows to load node $N_{LOAD}$ via the detecting unit 130, and the discharging circuit 113 is coupled between the battery unit 111 and the detecting unit 130.

As described previously, the power bank device and current-output method thereof according to any embodiment of the invention is used to switch the impedance of the impedance circuit based on the instantaneous change of the output current, so as to control the output voltage and to support the load for various charging demand without increasing the volume (or the size), of the whole circuit. That is, when the output current is increased, the control circuit adequately controls the impedance circuit to switch from high impedance to low impedance, so as to reduce the output voltage. Accordingly, when the charging chip of the load at the output end detects the lack of output power electricity from the power bank device, the load automatically adjusts the sinking current, such that the power bank device stably outputs the output current of a predetermined current to the load.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:
1. A power bank device, comprising:
a load node for connecting to a load outside the power bank device;
a power-supply circuit, for providing an output current to the load node, wherein an initial value of the output current is according to a sink of the load;
an output circuit, for generating an output voltage at the load node according to the output current, wherein the output circuit comprises an impedance circuit;
a detecting unit, for generating a detecting signal according to the output current, wherein when the initial value of the output current is below a predetermined current value, the detecting unit generates a detecting signal with a first value, and when the initial value of the output current is above the predetermined current value, the detecting unit generates a detecting signal with a second value;
a switching unit, for switching an impedance of the impedance circuit from a first impedance to a second impedance, wherein an impedance of the first impedance is larger than an impedance of the second imped- ance, and the output voltage of the output circuit is reduced by the second impedance; and a control circuit, for controlling the switching unit to switch to the impedance of the impedance circuit according to the detecting signal, wherein the control circuit controls the switching unit to switch the impedance of the impedance circuit from the first impedance to the second impedance when the detecting signal has the second value so as to reduce the output voltage and then reduce the output current to the load node when the load is changed from a low load to a high load;

wherein the switching unit is coupled between the impedance circuit and the control circuit.

2. The power bank device of claim 1, wherein the impedance circuit comprises:

a first resistor, connected to a first end of the switching unit;

a second resistor, connected to a second end of the switching unit; and a third resistor, connected between the first end of the switching unit and a ground;

wherein when the switching unit is off, the first resistor together with the third resistor co-work form the first impedance; and wherein when the switching unit is on, the first resistor and the second resistor are connected in parallel, and the first resistor, the second resistor, together with the third resistor co-work form the second impedance.

3. The power bank device of claim 2, wherein the switching unit is a metal-oxide-semiconductor field-effect transistor (MOSFET).

4. The power bank device of claim 1, wherein the detecting signal is a voltage signal, and when the voltage signal is changed from a low level to a high level, the control circuit reduces the output voltage of the output circuit, so as to reduce the output current.

5. The power bank device of claim 1, wherein the control circuit comprises:

an operational amplifier, for generating a driving signal according to the detecting signal and outputting the driving signal to the output circuit.

6. The power bank device of claim 5, wherein the output circuit is used for generating and outputting a feedback voltage corresponding to the output voltage to the power-supply circuit, such that the power-supply circuit reduces the output voltage and thus the output current is reduced.

7. The power bank device of claim 1, wherein the power-supply circuit comprises:

a battery unit, for providing a discharging current; and a discharging circuit, coupled between the battery unit and the detecting unit, for outputting the output current to the load node via the detecting unit according to the feedback voltage and the discharging current.

8. A current-output method of a power bank device, comprising:

providing an output current to a load node by using a power-supply circuit, wherein the load node is for connecting to a load outside the power bank device, and an initial value of the output current is according to a sink of the load;

generating an output voltage at the load node according to the output current by an output circuit, wherein the output circuit comprises an impedance circuit;

generating a detecting signal according to the output current by a detecting unit, wherein when the initial value of the output current is below a predetermined current value, the detecting unit generates a detecting signal with a first value, and when the initial value of the output current is above the predetermined current value, the detecting unit generates a detecting signal with a second value; and controlling, by a control circuit, a switching unit to switch the impedance of the impedance circuit according to the detecting signal, wherein the control circuit controls the switching unit to switch the impedance of the impedance circuit from a first impedance to a second impedance when the detecting signal has the second value so as to reduce the output voltage and then reduce the output current to the load node when the load is changed from a low load to a high load;

wherein an impedance of the first impedance is larger than an impedance of the second impedance, and the output voltage of the output circuit is reduced by the second impedance.

9. The current-output method of the power bank device of claim 8, wherein the detecting unit is an impedance element.

10. The current-output method of the power bank device of claim 9, wherein the step of generating the detecting signal further comprises:

converting the output current into a voltage signal as the detecting signal by using the impedance element.

11. The current-output method of the power bank device of claim 9, wherein the step of switching the impedance of the impedance circuit comprises:

amplifying the voltage signal; and switching from the first impedance to the second impedance according to the amplified voltage signal by using the switching unit.

12. The current-output method of the power bank device of claim 8, wherein the step of providing the output current comprises:

providing a discharging current by using a battery unit in the power-supply circuit;

generating a feedback voltage corresponding to the output voltage; and outputting the output current according to the feedback voltage and the discharging current via a discharging circuit in the power-supply circuit, wherein the output current flows to the load node via the detecting unit, and the discharging circuit is coupled between the battery unit and the detecting unit.

* * * * *